(12) United States Patent
Matsuyama (10) Patent No.: US 12,308,382 B2
(45) Date of Patent: May 20, 2025

(54) ALL-SOLID-STATE BATTERY

(71) Applicant: TOYOTA JIDOSHA KABUSHIKI KAISHA, Toyota (JP)

(72) Inventor: Takuya Matsuyama, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 173 days.

(21) Appl. No.: 17/530,071

(22) Filed: Nov. 18, 2021

(65) Prior Publication Data

US 2022/0173431 A1    Jun. 2, 2022

(30) Foreign Application Priority Data

Nov. 27, 2020 (JP) .................................. 2020-197154
Jul. 28, 2021 (JP) .................................. 2021-123559

(51) Int. Cl.
| | |
|---|---|
| *H01M 10/0562* | (2010.01) |
| *H01M 4/38* | (2006.01) |
| *H01M 4/40* | (2006.01) |
| *H01M 4/505* | (2010.01) |
| *H01M 4/52* | (2010.01) |
| *H01M 4/525* | (2010.01) |
| *H01M 10/0525* | (2010.01) |
| *H01M 4/36* | (2006.01) |

(52) U.S. Cl.
CPC ....... *H01M 10/0562* (2013.01); *H01M 4/386* (2013.01); *H01M 4/405* (2013.01); *H01M 4/505* (2013.01); *H01M 4/525* (2013.01); *H01M 10/0525* (2013.01); *H01M 4/364* (2013.01)

(58) Field of Classification Search
None
See application file for complete search history.

(56) References Cited

U.S. PATENT DOCUMENTS

| | | |
|---|---|---|
| 2006/0121351 A1 | 6/2006 | Sato et al. |
| 2008/0292963 A1 | 11/2008 | Sato et al. |
| 2009/0142669 A1 | 6/2009 | Shinohara et al. |
| 2009/0197182 A1 | 8/2009 | Katoh |
| 2012/0058385 A1 | 3/2012 | Ito et al. |
| 2012/0244433 A1 | 9/2012 | Yamasaki |
| 2013/0149616 A1 | 6/2013 | Lee et al. |
| 2013/0157143 A1 | 6/2013 | Hoshiba et al. |
| 2015/0093646 A1 | 4/2015 | Kawada |

(Continued)

FOREIGN PATENT DOCUMENTS

| | | |
|---|---|---|
| CN | 1719639 A | 1/2006 |
| CN | 101312245 A | 11/2008 |

(Continued)

OTHER PUBLICATIONS

U.S. Appl. No. 15/022,716, filed Mar. 17, 2016 in the name of Hisatsugu Yamasaki et al.

(Continued)

*Primary Examiner* — Yoshitoshi Takeuchi
(74) *Attorney, Agent, or Firm* — Oliff PLC (57) ABSTRACT

There is provided an all-solid-state battery including a positive electrode, a solid electrolyte layer, and a negative electrode, wherein the positive electrode contains a positive electrode active material, and the positive electrode active material has an O2 type structure and contains at least Li, Mn, Ni and O as constituent elements.

12 Claims, 4 Drawing Sheets

(56) References Cited

U.S. PATENT DOCUMENTS

| | | | |
|---|---|---|---|
| 2015/0270536 A1 | 9/2015 | Kawakami et al. | |
| 2015/0349378 A1 | 12/2015 | Ose et al. | |
| 2016/0233553 A1 | 8/2016 | Yamasaki et al. | |
| 2019/0280329 A1* | 9/2019 | Waseda | H01M 10/0525 |
| 2020/0136131 A1 | 4/2020 | Wakasugi et al. | |
| 2020/0266448 A1 | 8/2020 | Osada et al. | |
| 2021/0126282 A1* | 4/2021 | Ose | H01M 4/134 |
| 2022/0216460 A1* | 7/2022 | Kuroda | H01M 4/364 |

FOREIGN PATENT DOCUMENTS

| | | | | |
|---|---|---|---|---|
| CN | 110233281 A | 9/2019 | | |
| CN | 110537270 A | 12/2019 | | |
| JP | H07-183047 A | 7/1995 | | |
| JP | 2009-181921 A | 8/2009 | | |
| JP | 2009-187682 A | 8/2009 | | |
| JP | 2010-040218 A | 2/2010 | | |
| JP | 2010-092824 A | 4/2010 | | |
| JP | 2010-272357 A | 12/2010 | | |
| JP | 2011-243468 A | 12/2011 | | |
| JP | 2012-059484 A | 3/2012 | | |
| JP | 2012-059497 A | 3/2012 | | |
| JP | 2012-129150 A | 7/2012 | | |
| JP | 2012-204281 A | 10/2012 | | |
| JP | 2012-243408 A | 12/2012 | | |
| JP | 2013-026031 A | 2/2013 | | |
| JP | 2013-069416 A | 4/2013 | | |
| JP | 2013-069708 A | 4/2013 | | |
| JP | 2013-125750 A | 6/2013 | | |
| JP | 2014-137869 A | 7/2014 | | |
| JP | 2014-186937 A | 10/2014 | | |
| JP | 2016-141574 A | 8/2016 | | |
| JP | 2019-169365 A | 10/2019 | | |
| JP | 2020-068104 A | 4/2020 | | |
| JP | 2020092100 A | 6/2020 | | |
| JP | 2020-136265 A | 8/2020 | | |
| KR | 10-2008-0103447 A | 11/2008 | | |
| WO | 2014/111791 A1 | 7/2014 | | |
| WO | WO-2018193994 A1 * | 10/2018 | | H01M 10/0525 |
| WO | WO-2019046720 A1 * | 3/2019 | | H01M 10/0525 |
| WO | WO 2020/218474 * | 10/2020 | | H01M 4/525 |

OTHER PUBLICATIONS

Sep. 17, 2018 Office Action issued in U.S. Appl. No. 15/022,716.
Dec. 28, 2018 Notice of Allowance issued in U.S. Appl. No. 15/022,716.
U.S. Appl. No. 16/605,432, filed Oct. 15, 2019 in the name of Norihiro Ose et al.
Sep. 16, 2021 Office Action issued in U.S. Appl. No. 16/605,432.
Mar. 6, 18, 2022 Notice of Allowance issued in U.S. Appl. No. 16/605,432.

* cited by examiner

ALL-SOLID-STATE BATTERY

CROSS-REFERENCE TO RELATED APPLICATION

This application claims priority to Japanese Patent Application No. 2020-197154 filed on Nov. 27, 2020 and Japanese Patent Application No. 2021-123559 filed on Jul. 28, 2021, each incorporated herein by reference in its entirety.

BACKGROUND

1. Technical Field

The present disclosure discloses an all-solid-state battery.

2. Description of Related Art

Japanese Unexamined Patent Application Publication No. 2019-169365 (JP 2019-169365 A) discloses $LiCoO_2$ having an O2 type structure as a positive electrode active material of an all-solid-state battery. Japanese Unexamined Patent Application Publication No. 2014-186937 (JP 2014-186937 A), Japanese Unexamined Patent Application Publication No. 2010-092824 (JP 2010-092824 A), and Japanese Unexamined Patent Application Publication No. 2012-204281 (JP 2012-204281 A) disclose a lithium-containing transition metal oxide having an O2 type structure as a positive electrode active material of an electrolyte battery. Japanese Unexamined Patent Application Publication No. 2020-068104 (JP 2020-068104 A) discloses a material which contains a Li—Si alloy and elemental Si and has a specific XRD spectrum as a negative electrode active material of an all-solid-state battery. Japanese Unexamined Patent Application Publication No. 2012-243408 (JP 2012-243408 A) discloses a Li—Si alloy as a negative electrode active material of an all-solid-state battery.

SUMMARY

In batteries in the related art, there is room for improvement in cycle characteristics.

The present disclosure discloses an all-solid-state battery including a positive electrode, a solid electrolyte layer, and a negative electrode, wherein the positive electrode contains a positive electrode active material, and the positive electrode active material has an O2 type structure and contains at least Li, Mn, Ni and O as constituent elements.

In the all-solid-state battery of the present disclosure, the positive electrode active material may contain at least Li, Mn, Ni, Co and O as constituent elements.

In the all-solid-state battery of the present disclosure, the solid electrolyte layer may contain a sulfide solid electrolyte.

In the all-solid-state battery of the present disclosure, the negative electrode may contain elemental Si as a negative electrode active material and a Li—Si alloy as a negative electrode active material, and a mass ratio of the Li—Si alloy with respect to a total amount of the elemental Si and the Li—Si alloy may be 11.8 mass % or more and less than 88.2 mass %.

The all-solid-state battery of the present disclosure may include a restraining member.

The all-solid-state battery of the present disclosure has excellent cycle characteristics.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
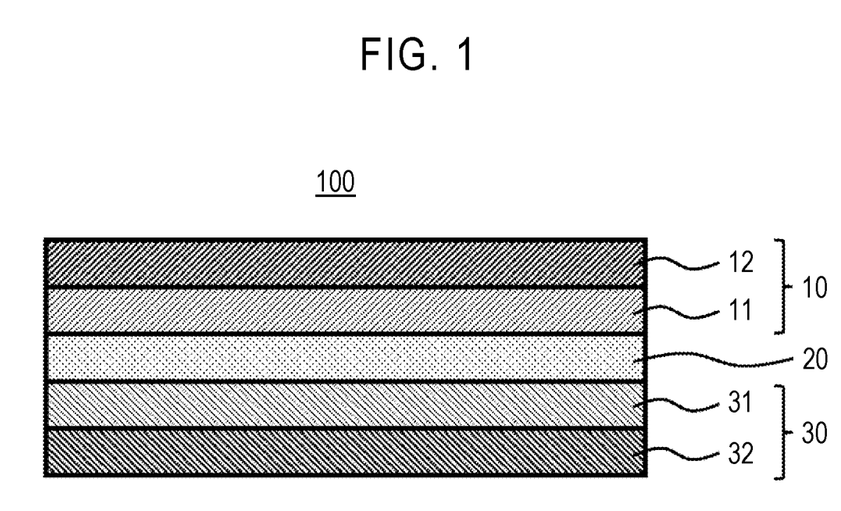
FIG. 1 schematically shows an example of a configuration of an all-solid-state battery.

As shown in FIG. 1, an all-solid-state battery 100 according to one embodiment includes a positive electrode 10, a solid electrolyte layer 20, and a negative electrode 30. The positive electrode 10 contains a positive electrode active material. The positive electrode active material has an O2 type structure, and contains at least Li, Mn, Ni and O as constituent elements.

1. Positive Electrode

The positive electrode 10 contains a positive electrode active material which has an O2 type structure and contains at least Li, Mn, Ni and O as constituent elements. As shown in FIG. 1, the positive electrode 10 may have a positive electrode active material layer 11 and a positive electrode current collector 12, and in this case, the positive electrode active material layer 11 may contain the positive electrode active material.

1.1 Positive Electrode Active Material Layer

The positive electrode active material layer 11 contains at least a positive electrode active material, and may further optionally contain a solid electrolyte, a conductive aid, a binder, and the like. The contents of the positive electrode active material, the solid electrolyte, the conductive aid and the binder in the positive electrode active material layer 11 may be appropriately determined according to desired battery performance. The shape of the positive electrode active material layer 11 is not particularly limited, and may be, for example, a sheet-like positive electrode active material layer 11 having a substantially flat surface. The thickness of the positive electrode active material layer 11 is not particularly limited, and may be, for example, 0.1 μm or more or 1 μm or more, and may be 2 mm or less or 1 mm or less.

1.1.1 Positive Electrode Active Material

The positive electrode active material has an O2 type structure and contains at least Li, Mn, Ni and O as constituent elements. In this manner, in the positive electrode active material having an O2 type structure, when a plurality of types of transition metals are included as constituent elements, the cycle characteristics of the all-solid-state battery can be easily improved. In particular, when the positive electrode active material contains at least Li, Mn, Ni, Co and O as constituent elements, the cycle characteristics of the all-solid-state battery can be easily further improved.

The positive electrode active material may have a chemical composition represented by $Li_xMn_aNi_bCo_cO_2$. x, a, b and c are not particularly limited as long as the O2 type structure can be maintained, and for example, x satisfies $0<x<1$. x may be 0.1 or more, 0.2 or more, 0.3 or more, 0.4 or more, 0.5 or more or 0.6 or more, and may be 0.9 or less or 0.8 or less. In addition, a, b, and c satisfy $0<a<1$, $0<b<1$, and $0 \leq c<1$, respectively. a may be 0.1 or more, 0.2 or more, 0.3 or more or 0.4 or more, and may be 0.9 or less, 0.8 or less, 0.7 or less or 0.6 or less. b may be 0.1 or more, and may be 0.9 or less, 0.8 or less, 0.7 or less, 0.6 or less, 0.5 or less, 0.4 or less or 0.3 or less. c may be 0 or more, 0.1 or more or 0.2 or more, and may be 0.9 or less, 0.8 or less, 0.7 or less, 0.6 or less, 0.5 or less or 0.4 or less. a+b+c may be 0.8 or more or 0.9 or more, and may be 1.2 or less or 1.1 or less.

The positive electrode active material layer 11 may contain only the above positive electrode active material as the positive electrode active material. Alternatively, the positive electrode active material layer 11 may contain a different type of positive electrode active material (other positive electrode active material) in addition to the above positive electrode active material. In order to further improve the effect of the technology of the present disclosure, the content of other positive electrode active materials in the positive electrode active material layer 11 may be small. For example, the content of the positive electrode active material which has an O2 type structure and contains Li, Mn, Ni and O as constituent elements may be 80 mass % or more, 90 mass % or more, 95 mass % or more or 99 mass % or more of the total positive electrode active material contained in the positive electrode active material layer 11.

The surface of the positive electrode active material may be composed of a protective layer containing a Li ion-conducting oxide. That is, the positive electrode active material layer 11 may contain a complex including a positive electrode active material which has an O2 type structure and contains at least Li, Mn, Ni and O as constituent elements, and a protective layer provided on the surface thereof. Thereby, the reaction between the positive electrode active material and the solid electrolyte is easily inhibited. Examples of Li ion-conducting oxides include $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $LiNbO_3$, $Li_2MoO_4$, and $Li_2WO_4$. The coverage (area ratio) of the protective layer may be, for example, 70% or more, 80% or more, or 90% or more. The thickness of the protective layer may be, for example, 0.1 nm or more or 1 nm or more, and may be 100 nm or less or 20 nm or less.

The shape of the positive electrode active material may be any general shape for an active material of a battery. For example, the positive electrode active material may be in the form of particles. The positive electrode active material particles may be solid particles or hollow particles. The positive electrode active material particles may be primary particles or secondary particles in which a plurality of primary particles are aggregated. The average particle diameter (D50) of the positive electrode active material particles may be, for example, 1 nm or more, 5 nm or more, or 10 nm or more, and may be 500 μm or less, 100 μm or less, 50 μm or less, or 30 μm or less. Here, the average particle diameter D50 referred to in the present disclosure is a particle diameter (median diameter) at a cumulative value of 50% in the volume-based particle size distribution obtained by the laser diffraction/scattering method.

1.1.2 Solid Electrolyte

As the solid electrolyte, those known as solid electrolytes for all-solid-state batteries may be used. The solid electrolyte may be an inorganic solid electrolyte or an organic polymer electrolyte. In particular, the inorganic solid electrolyte has higher ion conductivity than the organic polymer electrolyte. In addition, it has better heat resistance than the organic polymer electrolyte. Examples of inorganic solid electrolytes include oxide solid electrolytes such as lithium lanthanum zirconate, LiPON, $Li_{1+x}Al_xGe_{2-x}(PO_4)_3$, Li—SiO-based glass, and Li—Al—S—O-based glass; and sulfide solid electrolytes such as $Li_2S$—$P_2S_5$, $Li_2S$—$SiS_2$, LiI—$Li_2S$—$SiS_2$, LiI—$Si_2S$—$P_2S_5$, $Li_2S$—$P_2S_5$—LiI—LiBr, LiI—$Li_2S$—$P_2S_5$, LiI—$Li_2S$—$P_2O_5$, LiI—$Li_3PO_4$—$P_2S_5$, and $Li_2S$—$P_2S_5$—$GeS_2$. In particular, the performance of the sulfide solid electrolyte, particularly a sulfide solid electrolyte containing $Li_2S$—$P_2S_5$, is high. The solid electrolyte may be amorphous or crystalline. The solid electrolyte may be, for example, in the form of particles. The solid electrolytes may be used alone or two or more thereof may be used in combination.

1.1.3 Conductive Aid

Specific examples of conductive aids include carbon materials such as vapor grown carbon fibers (VGCF), acetylene black (AB), Ketjen black (KB), carbon nanotubes (CNT), and carbon nanofibers (CNF) and metal materials that can withstand an environment in which the all-solid-state battery is used, but the present disclosure is not limited thereto. The conductive aids may be used alone or two or more thereof may be used in combination.

1.1.4 Binder

Specific examples of binders include acrylonitrile butadiene rubber (ABR)-based binders, butadiene rubber (BR)-based binders, butylene rubber (IIR)-based binders, polyvinylidene fluoride (PVdF)-based binders, styrene butadiene rubber (SBR)-based binders, and polytetrafluoroethylene (PTFE)-based binders, but the present disclosure is not limited thereto. The binders may be used alone or two or more thereof may be used in combination.

1.2 Positive Electrode Current Collector

As the positive electrode current collector 12, any collector that is generally used as a current collector of a battery can be used. A bipolar current collector that serves as a positive electrode current collector and a negative electrode current collector may be provided in the positive electrode. For example, a positive electrode active material layer may be provided on one surface of the current collector and a negative electrode active material layer may be provided on the other surface. The positive electrode current collector 12 may be formed of a metal foil, a metal mesh or the like. In consideration of excellent handling properties and the like, the positive electrode current collector 12 may be a metal foil. The positive electrode current collector 12 may be formed of a plurality of metal foils. Examples of metals constituting the positive electrode current collector 12 include Cu, Ni, Cr, Au, Pt, Ag, Al, Fe, Ti, Zn, Co, and stainless steel. The positive electrode current collector 12 may have some coating layers on the surface thereof in order to adjust the resistance or the like. In addition, the positive electrode current collector 12 may be a collector obtained by plating or vapor-depositing the above metal on a metal foil, a base material or the like. In addition, when the positive electrode current collector 12 is formed of a plurality of metal foils, some layers may be provided between the plurality of metal foils. The thickness of the positive electrode current collector 12 is not particularly limited. It may be, for example, 0.1 μm or more or 1 μm or more, and may be 1 mm or less or 100 μm or less.

2. Solid Electrolyte Layer

As shown in FIG. 1, the solid electrolyte layer 20 is disposed between the positive electrode 10 and the negative electrode 30. The solid electrolyte layer 20 contains a solid electrolyte, and may additionally optionally contain a binder or the like. The solid electrolyte may be an oxide solid electrolyte or sulfide solid electrolyte. In particular, when the solid electrolyte layer 20 contains a sulfide solid electrolyte, and particularly contains a sulfide solid electrolyte containing $Li_2S$—$P_2S_5$, the performance of the all-solid-state battery 100 may be further improved. A binder appropriately selected from those exemplified as the binder used for the active material layer can be used. The content of each component in the solid electrolyte layer may be the same as in the related art. The shape of the solid electrolyte layer may be the same as in the related art, and may be, for example, a sheet-like solid electrolyte layer having a substantially flat surface. The thickness of the solid electrolyte layer may be, for example, 0.1 μm or more or 1 μm or more, and may be 2 mm or less or 1 mm or less.

3. Negative Electrode

The negative electrode 30 contains a negative electrode active material. As shown in FIG. 1, the negative electrode 30 may include a negative electrode active material layer 31 and a negative electrode current collector 32, and in this case, the negative electrode active material layer 31 may contain a negative electrode active material.

3.1 Negative Electrode Active Material Layer

The negative electrode active material layer 31 contains at least a negative electrode active material, and may additionally optionally contain a solid electrolyte, a conductive aid, a binder and the like. The contents of the negative electrode active material, the solid electrolyte, the conductive aid and the binder in the negative electrode active material layer 31 may be appropriately determined according to desired battery performance. The shape of the negative electrode active material layer 31 is not particularly limited, and may be, for example, a sheet-like negative electrode active material layer having a substantially flat surface. The thickness of the negative electrode active material layer 31 is not particularly limited, and may be, for example, 0.1 μm or more or 1 μm or more, and may be 2 mm or less or 1 mm or less.

3.1.1 Negative Electrode Active Material

As the negative electrode active material, any material known as a negative electrode active material of an all-solid-state battery can be used, and various substances whose potential (charging and discharging potential) at which lithium ions are occluded and released is lower than that of the positive electrode active material can be used. For example, silicon-based active materials such as Si, Si alloys, and silicon oxide; carbon-based active materials such as graphite and hard carbon; various oxide-based active materials such as lithium titanate; and metallic lithium, lithium alloys and the like can be used. The negative electrode active materials may be used alone or two or more thereof may be used in combination.

According to findings by the inventors, when the negative electrode 30 contains elemental Si and a Li—Si alloy as the negative electrode active material, it is easy to secure a high discharging capacity in the all-solid-state battery 100. Specifically, when the negative electrode 30 contains both elemental Si and a Li—Si alloy as the negative electrode active material, the amount of Li inserted into the positive electrode active material having an O2 type structure during discharging is larger than when the negative electrode 30 contains only elemental Si. That is, an amount of Li that exceeds the amount of Li that the positive electrode active material has in the initial stage (before charging and discharging) can be inserted into the positive electrode active material. On the other hand, when the negative electrode contains only a Li—Si alloy as the negative electrode active material, there is a risk of Li being unable to be occluded in the negative electrode, and as a result, there is a risk of short-circuiting occurring in the battery.

The composition of the Li—Si alloy is not particularly limited. For example, the Li—Si alloy may have a composition represented by $Li_\alpha Si_\beta (0<\alpha/\beta \leq 4.4)$. $\alpha/\beta$ may be 0.1 or more, 0.5 or more, or 1.5 or more. Specific examples of Li—Si alloys include $Li_{0.54}Si$, $Li_{0.87}Si$, $Li_{1.2}Si$, $Li_{2.2}Si$, $Li_{3.75}Si$, and $Li_{4.4}Si$.

In the all-solid-state battery 100, a mass ratio of the Li—Si alloy with respect to the total amount of the elemental Si and the Li—Si alloy contained in the negative electrode 30 may be 11.8 mass % or more and less than 88.2 mass %. According to findings by the inventors, when the mass ratio between the elemental Si and the Li—Si alloy is adjusted to be within the above range, the discharging capacity of the all-solid-state battery 100 is further significantly improved while using the positive electrode active material having an O2 type structure. The mass ratio of the Li—Si alloy with respect to the total amount of the elemental Si and the Li—Si alloy may be 20.0 mass % or more, 30.0 mass % or more, 40.0 mass % or more or 50.0 mass % or more, and may be 85.0 mass % or less, 80.0 mass % or less or 74.0 mass % or less. In particular, when the mass ratio is 50.0 mass % or more and 74.0 mass % or less, the discharging capacity of the all-solid-state battery 100 can be further significantly improved.

The negative electrode active material layer 31 may contain only elemental Si and a Li—Si alloy as the negative electrode active material. Alternatively, the negative electrode active material layer 31 may contain other active materials in addition to elemental Si and the Li—Si alloy. Alternatively, the negative electrode active material layer 31 may contain neither elemental Si nor a Li—Si alloy, but may contain other negative electrode active materials. In order to further increase the discharging capacity, the content of the active materials other than the elemental Si and the Li—Si alloy in the negative electrode active material layer may be small. For example, a total amount of the elemental Si and the Li—Si alloy may be 80 mass % or more, 90 mass % or more, 95 mass % or more or 99 mass % or more of the total negative electrode active material contained in the negative electrode active material layer 31.

The shape of the negative electrode active material may be any general shape for an active material of a battery. For example, the negative electrode active material may be in the form of particles. The negative electrode active material particles may be primary particles or secondary particles in which a plurality of primary particles are aggregated. The average particle diameter (D50) of the negative electrode active material particles may be, for example, 1 nm or more, 5 nm or more, or 10 nm or more, and may be 500 μm or less, 100 μm or less, 50 μm or less, or 30 μm or less.

3.1.2 Solid Electrolyte, Conductive Aid and Binder

Examples of solid electrolytes that can be contained in the negative electrode active material layer 31 include the above oxide solid electrolytes and sulfide solid electrolytes. In particular, the performance of the sulfide solid electrolyte, particularly a sulfide solid electrolyte containing $Li_2S$—$P_2S_5$, is high. Examples of conductive aids that can be contained in the negative electrode active material layer 31 include the above carbon materials and the above metal materials (nickel, aluminum, stainless steel, etc.). Examples of binders that can be contained in the negative electrode active material layer include acrylonitrile butadiene rubber (ABR)-based binders, butadiene rubber (BR)-based binders, butylene rubber (IIR)-based binders, polyvinylidene fluoride (PVdF)-based binders, styrene butadiene rubber (SBR)-based binders, and polytetrafluoroethylene (PTFE)-based binders.

3.2 Negative Electrode Current Collector

As the negative electrode current collector 32, any collector that is generally used as a current collector of a battery can be used. A bipolar current collector that serves as a positive electrode current collector and a negative electrode current collector may be provided in the negative electrode 30. The negative electrode current collector 32 may be formed of a metal foil, a metal mesh or the like. Alternatively, it may be formed of a carbon sheet. In consideration of excellent handling properties and the like, the negative electrode current collector 32 may be a metal foil. The negative electrode current collector 32 may be formed of a plurality of metal foils or sheets. Examples of metals constituting the negative electrode current collector 32 include Cu, Ni, Cr, Au, Pt, Ag, Al, Fe, Ti, Zn, Co, and stainless steel. The negative electrode current collector 32 may have some coating layers on the surface thereof in order to adjust the resistance or the like. In addition, the negative electrode current collector 32 may be a collector obtained by plating or vapor-depositing the above metal on a metal foil, a base material or the like. In addition, when the negative electrode current collector 32 is formed of a plurality of metal foils or sheets, some layers may be provided between the plurality of metal foils or sheets. The thickness of the negative electrode current collector 32 is not particularly limited. It may be, for example, 0.1 μm or more or 1 μm or more, and may be 1 mm or less or 100 μm or less.

4. Other Configurations

As described above, when the all-solid-state battery 100 contains elemental Si and a Li—Si alloy as the negative electrode active material, it is possible to increase the discharging capacity of the all-solid-state battery 100. In the all-solid-state battery 100, the capacity of the positive electrode 10 and the capacity of the negative electrode 30 in the initial stage (immediately after the battery is produced, before the first charging and discharging) may be appropriately determined according to desired battery performance. For example, the ratio $C_1/C_2$ of the capacity $C_1$ of the positive electrode 10 to the capacity $C_2$ of the negative electrode 30 in the initial stage may be 0.1 or more or 0.2 or more, and may be 1.0 or less or 0.9 or less.

The all-solid-state battery 100 may include some members in addition to those of the above configuration. For example, the all-solid-state battery 100 may include a restraining member (not shown). The direction of the restraining pressure of the restraining member may match a direction in which the positive electrode 10, the solid electrolyte layer 20 and the negative electrode 30 are laminated. The restraining pressure is not particularly limited, and may be, for example, 1 MPa or more and 20 MPa or less. Therefore, even if a material having large expansion and contraction due to charging and discharging is used in the battery, the interface resistance in each layer can be reduced, and an all-solid-state battery having better cycle characteristics can be obtained. In addition, the all-solid-state battery 100 may include necessary terminals, a battery case, and the like.

5. Method of Producing All-Solid-State Battery

The all-solid-state battery 100 can be produced by a known method except that the positive electrode 10 is provided. That is, the method of producing the all-solid-state battery 100 includes preparing a positive electrode active material which has an O2 type structure and contains at least Li, Mn, Ni and O as constituent elements, obtaining a positive electrode mixture containing the positive electrode active material, obtaining a positive electrode using the positive electrode mixture, and laminating the positive electrode, a solid electrolyte layer, and a negative electrode.

The positive electrode mixture may form the positive electrode active material layer 11. That is, the positive electrode mixture may contain a solid electrolyte, a conductive aid, a binder and the like in addition to the positive electrode active material. The method of obtaining a positive electrode using a positive electrode mixture is not particularly limited, and for example, a positive electrode can be obtained by molding the positive electrode mixture together with the positive electrode current collector by a dry method or a wet method. The solid electrolyte layer and the negative electrode may be obtained by molding the above materials by a dry method or a wet method.

6. Supplement

6.1 Positive Electrode

A lithium transition metal oxide having an O2 type structure can be obtained by synthesizing a sodium transition metal oxide having a P2 type structure and then substituting Na in the sodium transition metal oxide with Li. For example, a lithium cobalt oxide having an O2 type structure disclosed in JP 2019-169365 A can be obtained by substituting Na in the sodium cobalt oxide having a P2 type structure with Li. However, according to findings by the inventors, in the P2 type sodium cobalt oxide, Na is stably present in the crystal structure, and substitution with Li does not easily proceed. Therefore, Na is not removed but remains in the O2 type lithium cobalt oxide after Li substitution. Here, it is thought that Na remaining in the positive electrode active material inhibits conduction of Li. That is, it is thought that Na inhibits release of Li from the positive electrode active material and occlusion of Li in the positive electrode active material. In addition, if Li is desired to be forcibly moved, the crystal structure may collapse and the performance of the active material may deteriorate. In addition, the crystallinity of the O2 type structure tends to decrease due to the residual Na. In this manner, when the lithium cobalt oxide having an O2 type structure disclosed in JP 2019-169365 A is used as the positive electrode active material of the all-solid-state battery, the cycle characteristics of the all-solid-state battery tends to deteriorate due to Na remaining in the positive electrode active material.

On the other hand, in the all-solid-state battery of the present disclosure, the positive electrode active material which has an O2 type structure and contains at least Li, Mn, Ni and O as constituent elements is used. According to findings by the inventors, in a P2 type sodium Transition metal oxide containing at least Mn and Ni as constituent elements, Na is unstable in the crystal structure and Na is easily released compared to a P2 type sodium cobalt oxide. That is, Na in the sodium transition metal oxide can be easily substituted with Li, and Na is unlikely to remain in the O2 type positive electrode active material. As a result, it is thought that the adverse effect due the residual Na as described above is reduced, and the cycle characteristics of the all-solid-state battery can be improved.

In addition, according to findings by the inventors, the all-solid-state battery using the positive electrode active material having an O2 type structure has better cycle characteristics than the electrolyte battery using the same positive electrode active material. This is speculated to be because, in the all-solid-state battery, since the periphery of the positive electrode active material is solidified with a solid, the conductive aid is unlikely to move even if the positive electrode active material expands or contracts, and the conductive path is easily maintained compared to an electrolyte battery in which the contact state between the positive electrode active material and the conductive aid is likely to change. In addition, it is thought that, in the all-solid-state battery, this effect is further improved by applying a restraining pressure of the restraining member.

6.2 Negative Electrode

The O3 type positive electrode active material ($LiNi_{1/3}Co_{1/3}Mn_{1/3}O_2$) or the like has a Li amount (composition ratio) of 1 with respect to $O_2$ and does not have Li deficiency. That is, it can have a sufficient capacity without supplying Li from the side of the negative electrode. On the other hand, according to findings by the inventors, since the O2 type positive electrode active material as described above has a Li amount of less than 1 with respect to $O_2$ and has Li deficiency, the positive electrode capacity is significantly improved by supplying Li from the side of the negative electrode. That is, it is thought that, in the all-solid-state battery, when a Li-deficient type positive electrode active material is used, it is effective to use a Li metal or a Li alloy that can supply Li from the negative electrode to the positive electrode as the negative electrode active material. On the other hand, according to findings by the inventors, if only a Li metal or a Li alloy is used as the negative electrode active material, Li drawn from the side of the positive electrode may not be occluded on the side of the negative electrode, and there is a risk of short-circuiting occurring in the battery. In this regard, in the all-solid-state battery, when the elemental Si is used together with the Li—Si alloy as the negative electrode active material, Li drawn from the side of the positive electrode can be easily occluded on the side of the negative electrode. In particular, when the mass ratio of the Li—Si alloy with respect to the total amount of the elemental Si and the Li—Si alloy is 11.8 mass % or more and less than 88.2 mass %, it is possible to secure a significantly high discharging capacity for the entire battery while securing a Li occlusion capacity in the negative electrode.

1. Comparison Between All-Solid-State Batteries

As shown below, all-solid-state batteries using a lithium cobalt oxide ($Li_{0.7}CoO_2$) having an O2 type structure as the positive electrode active material and all-solid-state batteries using those having a O2 type structure and containing Li, Mn, Ni and O as constituent elements, and using those having a O2 type structure and containing Li, Mn, Ni, Co and O as the positive electrode active material were produced, and the cycle characteristics of each battery were evaluated.

1.1 Example 1

1.1.1 Production of Positive Electrode Active Material

A solution 1 was obtained by dissolving 43.06 g of $Mn(NO_3)_2.6H_2O$, 17.97 g of $Ni(NO_3)_2.6H_2O$, and 26.98 g of $Co(NO_3)_2.6H_2O$ in 250 g of pure water. A solution 2 was obtained by dissolving 31.8 g of $Na_2CO_3$, and 10.1 mL of ammonia water in 250 g of pure water. The solution 1 and the solution 2 were simultaneously added dropwise to a beaker containing 100 mL of pure water to obtain a mixed solution. The obtained mixed solution was stirred at 50° C. overnight. After stirring, the mixed solution was washed with pure water, and then dried at 120° C. for 48 hours or longer to obtain an intermediate substance 1 (($Mn_{0.5}Ni_{0.2}Co_{0.3}$)$CO_3$).

13.5 g of the intermediate substance 1 and 4.28 g of $Na_2CO_3$ were mixed in a mortar and compacted by isostatic pressing and then held at 600° C. for 6 hours and then held at 900° C. for 24 hours, and firing was performed to obtain an intermediate substance 2 ($Na_{0.7}Mn_{0.5}Ni_{0.2}Co_{0.3}O_2$).

Figure 2A:
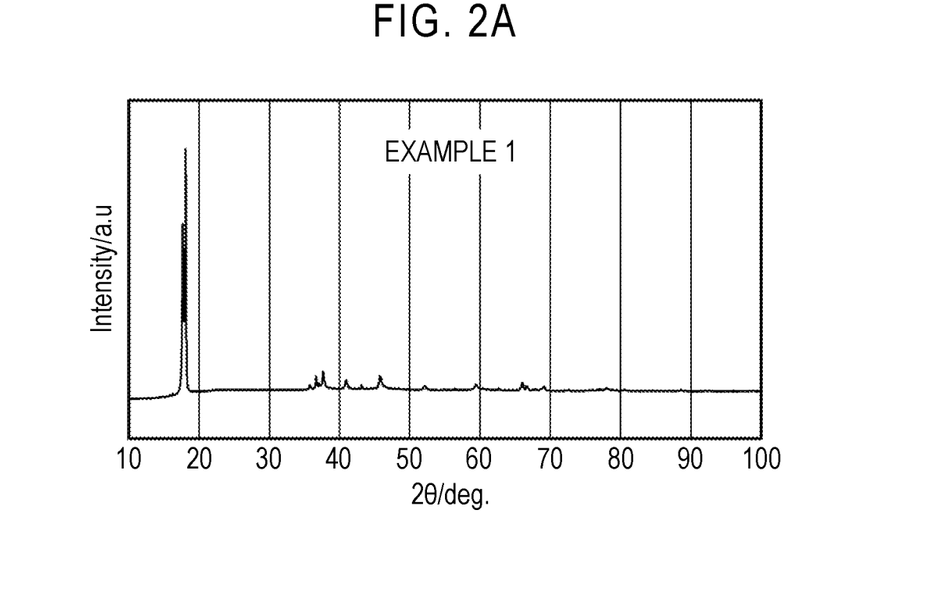
FIG. 2A shows an X-ray diffraction pattern of a positive electrode active material of Example 1.

3.5 g of the intermediate substance 2, 4.77 g of LiCl, and 7.75 g of $LiNO_3$ were mixed and held at 280° C. for 1 hour and dissolved. Then, washing with pure water was performed and filtering and drying were performed to obtain $Li_{0.7}Mn_{0.5}Ni_{0.2}Co_{0.3}O_2$ as a positive electrode active material. FIG. 2A shows an X-ray diffraction pattern of the positive electrode active material. As shown in FIG. 2A, it was confirmed that the positive electrode active material had an O2 type structure. In addition, substantially no Na remained in the positive electrode active material.

0.2 g of $Li_{0.7}Mn_{0.5}Ni_{0.2}Co_{0.3}O_2$ and 0.11747 g of each of an Nb solution (containing Li ions and an Nb peroxo complex) and water was weighed out, and mixed in an agate mortar to obtain a mixture containing a powder and a solution. After the mixture was uniformly mixed, on a hot plate set at 80° C., the mixture was mixed while heating the agate mortar, and the solution was evaporated to obtain a powder. The obtained powder was vacuum-heated and dried at 200° C. for 5 hours to obtain a positive electrode active material having a protective layer (Nb-coated $Li_{0.7}Mn_{0.5}Ni_{0.2}Co_{0.3}O_2$).

1.1.2 Production of Solid Electrolyte 0.550 g of $Li_2S$ (commercially available from Furuuchi Chemical Corporation), 0.887 g of $P_2S_5$ (commercially available from Sigma-Aldrich Co. Ltd.), 0.285 g of LiI (commercially available from Nippoh Chemicals Co., Ltd.), and 0.277 g of LiBr (commercially available from Kojundo Chemical Lab. Co., Ltd.) were mixed in an agate mortar to obtain a mixture. 4 g of n-heptane was added to the obtained mixture and mechanical milling was performed using a planetary ball mill for 40 hours to obtain a solid electrolyte ($Li_2S$—$LiBr$—$LiI$—$P_2S_5$).

1.1.3 Production of Positive Electrode Mixture 1.5 g of the positive electrode active material, 0.023 g of VGCF as a conductive aid, 0.239 g of a solid electrolyte, and 0.8 g of butyl butyrate were mixed using an ultrasonic homogenizer (commercially available from SMT, UH-50) to obtain a positive electrode mixture.

1.1.4 Production of Negative Electrode Active Material 0.44 g of the metallic Li and 0.375 g of the elemental Si were mixed with an agate mortar to obtain a Li—Si alloy ($Li_{15}Si_4$). The obtained Li—Si alloy and the elemental Si were mixed so that the mass ratio was 50:50 to obtain a negative electrode active material.

1.1.5 Production of Negative Electrode Mixture 1.0 g of a negative electrode active material, 0.04 g of VGCF as a conductive aid, 0.776 g of a solid electrolyte, and 1.7 g of n-heptane were mixed using an ultrasonic homogenizer (commercially available from SMT, UH-50) to obtain a negative electrode mixture.

1.1.6 Production of Solid Electrolyte Layer 0.065 g of the solid electrolyte was added to a ceramic mold (cross-sectional area: 1 $cm^2$), and pressing was performed at 1 ton/$cm^2$ to form a solid electrolyte layer.

1.1.7 Production of All-Solid-State Battery 0.018 g of the positive electrode mixture was laminated on one surface of the solid electrolyte layer and pressing was performed at 1 ton/$cm^2$ to form a positive electrode active material layer. 0.0054 g of the negative electrode mixture was laminated on the other surface of the solid electrolyte layer and pressing was performed at 4 ton/$cm^2$ to form a negative electrode active material layer. A positive electrode current collector (aluminum foil) was disposed on the side of the positive electrode active material layer and a negative electrode current collector (copper foil) was disposed on the side of the negative electrode active material layer to produce an all-solid-state battery for evaluation.

1.2 Example 2

An all-solid-state battery was produced in the same manner as in Example 1 except that the following $Li_{0.7}Mn_{0.7}Ni_{0.2}Co_{0.1}O_2$ was obtained as the positive electrode active material.

A solution 1A was obtained by dissolving 60.278 g of $Mn(NO_3)_2 \cdot 6H_2O$, 17.971 g of $Ni(NO_3)_2 \cdot 6H_2O$, and 8.993 g of $Co(NO_3)_2 \cdot 6H_2O$ in 250 g of pure water. A solution 2A was obtained by dissolving 31.8 g of $Na_2CO_3$ and 10.1 mL of ammonia water in 250 g of pure water. The solution 1A and the solution 2A were simultaneously added dropwise to a beaker containing 100 mL of pure water to obtain a mixed solution. The obtained mixed solution was stirred at 50° C. overnight. After stirring, the mixed solution was washed with pure water, and then dried at 120° C. for 48 hours or longer to obtain an intermediate substance 1A (($Mn_{0.7}Ni_{0.2}Co_{0.1})CO_3$).

13.5 g of the intermediate substance 1A and 4.3136 g of $Na_2CO_3$ were mixed in a mortar and compacted by isostatic pressing and then held at 600° C. for 6 hours and then held at 900° C. for 24 hours, and firing was performed to obtain an intermediate substance 2A ($Na_{0.7}Mn_{0.7}Ni_{0.2}Co_{0.1}O_2$).

3.5 g of the intermediate substance 2 A, 4.803 g of LiCl, and 7.811 g of $LiNO_3$ were mixed and held at 280° C. for 1 hour and dissolved. Then, washing with pure water was performed and filtering and drying were performed to obtain $Li_{0.7}Mn_{0.7}Ni_{0.2}Co_{0.1}O_2$ as a positive electrode active material. Based on the X-ray diffraction pattern, it was confirmed that the positive electrode active material had an O2 type structure. In addition, substantially no Na remained in the positive electrode active material.

1.3 Example 3

An all-solid-state battery was produced in the same manner as in Example 1 except that the following $Li_{0.7}Mn_{2/3}Ni_{1/3}O_2$ was obtained as the positive electrode active material.

A solution 1B was obtained by dissolving 5.770 g of $Mn(NO_3)_2 \cdot 6H_2O$ and 2.965 g of $Ni(NO_3)_2 \cdot 6H_2O$ in 250 g of pure water. A solution 2B was obtained by dissolving 31.8 g of $Na_2CO_3$ and 10.1 mL of ammonia water in 250 g of pure water. The solution 1B and the solution 2B were simultaneously added dropwise to a beaker containing 100 mL of pure water to obtain a mixed solution. The obtained mixed solution was stirred at 50° C. overnight. After stirring, the mixed solution was washed with pure water, and then dried at 120° C. for 48 hours or longer to obtain an intermediate substance 1B (($Mn_{2/3}Ni_{1/3})CO_3$).

13.5 g of the intermediate substance 1B and 4.3098 g of $Na_2CO_3$ were mixed in a mortar and compacted by isostatic pressing and then held at 600° C. for 6 hours and then held at 900° C. for 24 hours, and firing was performed to obtain an intermediate substance 2B ($Na_{0.7}Mn_{2/3}Ni_{1/3}O_2$).

3.5 g of the intermediate substance 2B, 4.798 g of LiCl, and 7.804 g of $LiNO_3$ were mixed and held at 280° C. for 1 hour and dissolved. Then, washing with pure water was performed and filtering and drying were performed to obtain $Li_{0.7}Mn_{2/3}Ni_{1/3}O_2$ as a positive electrode active material. Based on the X-ray diffraction pattern, it was confirmed that the positive electrode active material had an O2 type structure. In addition, substantially no Na remained in the positive electrode active material.

1.4 Comparative Example 1

An all-solid-state battery was produced in the same manner as in Example 1 except that the following $Li_{0.7}CoO_2$ was obtained as the positive electrode active material.

A solution 1C was obtained by dissolving 44.964 g of $Co(NO_3)_3 \cdot 6H_2O$ in 250 g of pure water. A solution 2C was obtained by dissolving 31.8 g of $Na_2CO_3$ and 10.1 mL of ammonia water in 250 g of pure water. The solution 1C and the solution 2C were simultaneously added dropwise to a beaker containing 100 mL of pure water to obtain a mixed solution. The obtained mixed solution was stirred at 50° C. overnight. After stirring, the mixed solution was washed with pure water, and then dried at 120° C. for 48 hours or longer to obtain an intermediate substance 1C ($CoCO_3$).

13.5 g of the intermediate substance 1C and 5.202 g of $Na_2CO_3$ were mixed in a mortar and compacted by isostatic pressing and then held at 600° C. for 6 hours and then held at 900° C. for 24 hours, and firing was performed to obtain an intermediate substance 2C ($Na_{0.7}CoO_2$).

Figure 2B:
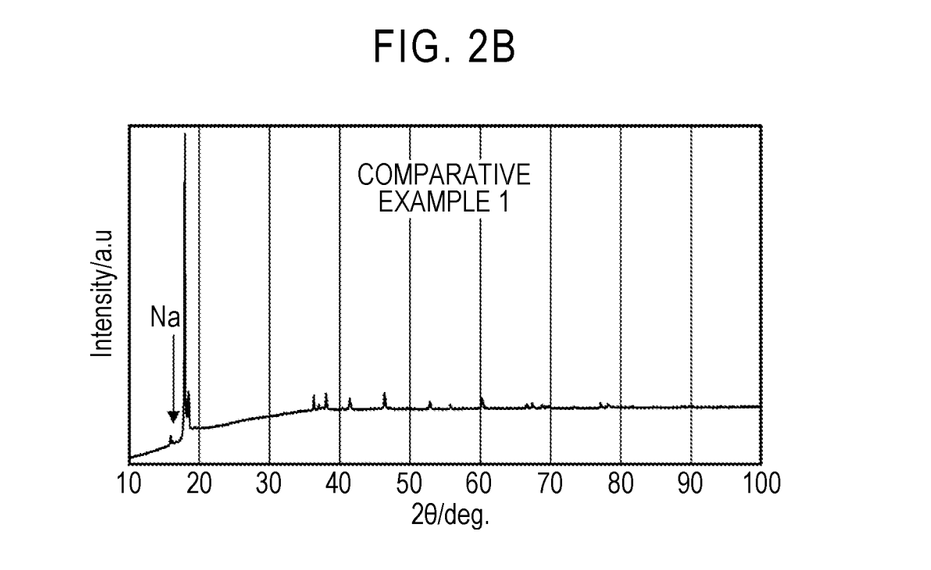
FIG. 2B shows an X-ray diffraction pattern of a positive electrode active material of Comparative Example 1.

3.5 g of the intermediate substance 2 C, 4.884 g of LiCl and 7.943 g of $LiNO_3$ were mixed and held at 280° C. for 1 hour and dissolved. Then, washing with pure water was performed and filtering and drying were performed to obtain $Li_{0.7}CoO_2$ as a positive electrode Active material. FIG. 2B shows an X-ray diffraction pattern of the positive electrode active material. As shown in FIG. 2B, it was confirmed that the positive electrode active material had an O2 type structure. In addition, the residual Na in the positive electrode active material was confirmed. Specifically, about 0.01 mol of Na was contained in 1 mol of Co.

1.5 Evaluation of Cycle Characteristics

For each of the all-solid-state batteries according to Examples 1 to 3 and Comparative Example 1, CC charging and discharging were repeated in a thermostatic chamber at 25° C. at a discharge end potential of 2.0 V (vs. Li/Li+), a charge end potential of 4.8 V (vs. Li/Li+), and a current density of 0.1C. The retention rate (%) of the discharging capacity after 100 cycles was determined using the first discharging capacity as a reference (100%). The results are shown in FIG. 3.

Figure 3:
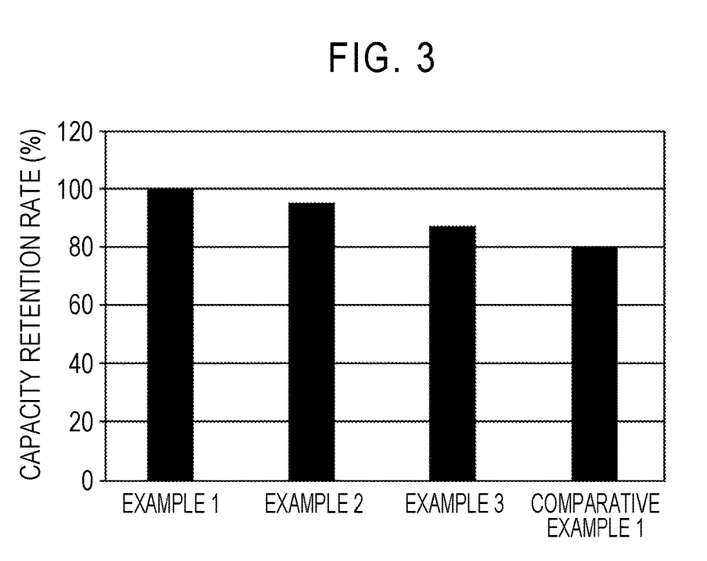
FIG. 3 shows the evaluation results of cycle characteristics.

As can be clearly understood from the results shown in FIG. 3, the all-solid-state batteries according to Examples 1 to 3 had better cycle characteristics than the all-solid-state battery according to Comparative Example 1. This is speculated to be due to the following mechanism.

In Comparative Example 1, even if it was desired to substitute Na with Li in the intermediate substance 2C, Na could not be sufficiently removed. Therefore, it was thought that Na remaining in the positive electrode active material inhibited conduction of Li. That is, it was thought that Na inhibited release of Li from the positive electrode active material and occlusion of Li in the positive electrode active material. In addition, the crystal structure may collapse when Li has been forcibly moved. In addition, it is thought that the crystallinity of the O2 type structure also decreased due the residual Na. In this manner, it was thought that, when the lithium cobalt oxide having an O2 type structure was used as the positive electrode active material of the all-solid-state battery, cycle characteristics of the all-solid-state battery deteriorated due to Na remaining in the positive electrode active material.

On the other hand, in Examples 1 to 3, substantially no Na remained in the positive electrode active material. It was thought that Na in the crystal structure in the intermediate substance was unstable, and was easily substituted with Li. As a result, it was thought that the adverse effect due to the residual Na as described above was reduced, and the cycle characteristics of the all-solid-state battery was improved compared to Comparative Example 1.

2. Comparison Between All-Solid-State Battery and Electrolyte Battery

As shown below, an all-solid-state battery using a positive electrode active material having an O2 type structure and an electrolyte battery using the same positive electrode active material were produced, and the cycle characteristics of each battery were evaluated.

2.1 Example 1 and Comparative Example 1

An all-solid-state battery was produced in the same manner as in Example 1 and Comparative Example 1.

2.2 Comparative Example 2

2.2.1 Production of Positive Electrode

In the same manner as in Example 1, $Li_{0.7}Mn_{0.5}Ni_{0.2}Co_{0.3}O_2$ as the positive electrode active material was obtained. The positive electrode active material, acetylene black as a conductive aid, and polyvinylidene fluoride as a binder were mixed at a mass ratio of 85:10:5, a slurry was formed using N-methyl-2-pyrrolidone, and the slurry was then applied to an Al current collector. Then, vacuum-drying was performed at 120° C., and molding was performed to obtain a positive electrode.

2.2.2 Preparation of Negative Electrode and Electrolyte Solution

A metallic lithium foil cut to a predetermined size was used as the negative electrode. In addition, a non-aqueous electrolyte solution (commercially available from Daikin Industries, Ltd.) (1.0 $MLiPF_6$/TW5(TFPC)+F3(TFEMC)30:70 vol %+TL16(LiDFOB 0.98 wt %)) was used as the electrolyte solution.

2.2.3 Production of Coin Cell

A coin cell as an electrolyte battery was produced using the above positive electrode, negative electrode and electrolyte solution in an inert atmosphere.

2.3 Evaluation of Cycle Characteristics

Figure 4:
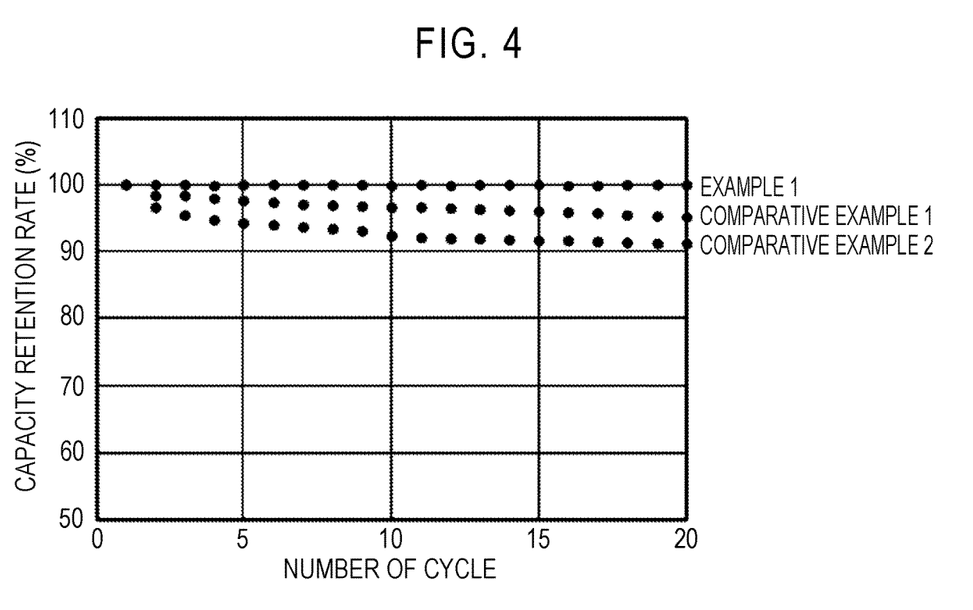
FIG. 4 shows the evaluation results of cycle characteristics.

For each of the all-solid-state batteries according to Example 1 and Comparative Example 1 and the electrolyte battery according to Comparative Example 2, CC charging and discharging were repeated in a thermostatic chamber at 25° C. at a discharge end potential of 2.0 V (vs. Li/Li+), a charge end potential of 4.8 V (vs. Li/Li+), and a current density of 0.1 C. FIG. 4 shows changes in the capacity retention rate from the $1^{st}$ to 20th cycle for the batteries.

As can be clearly understood from the results shown in FIG. 4, the all-solid-state batteries according to Example 1 and Comparative Example 1 had better cycle characteristics than the electrolyte battery according to Comparative Example 2. This was speculated to be due to the following mechanism.

The reason why the cycle characteristics in the electrolyte battery of Comparative Example 2 deteriorated was speculated to be because, when the positive electrode active material expanded or contracted according to charging or discharging, the contact state between the positive electrode active material and the conductive material was easily changed. On the other hand, it was thought that, in the all-solid-state batteries of Example 1 and Comparative Example 1, since the periphery of the positive electrode active material was solidified with a solid, the conductive material was unlikely to move even if the positive electrode active material expanded or contracted, and the conductive path was easily maintained. As a result, it was thought that better cycle characteristics were secured in the all-solid-state batteries of Example 1 and Comparative Example 1 than the electrolyte battery of Comparative Example 2.

3. Comparison of Negative Electrode

As shown in the following Table 1, an all-solid-state battery was produced in the same manner as in Example 1 except that a proportion of the Li—Si alloy contained in the negative electrode active material was changed.

For each of the all-solid-state batteries, constant current constant voltage charging (CC/CV charging) was performed to 4.8 V at 0.105 mA (initial charging). Next, constant current constant voltage discharging (CC/CV discharging) was performed to 2.0 V at 0.105 mA (initial discharging), and the discharging capacity of the positive electrode was measured. The evaluation results are shown in the following Table 1 and FIG. 5.

TABLE 1

|  | Mass ratio of Li—Si alloy (mass %) | Discharging capacity (mAh/g) |
| --- | --- | --- |
| Reference Example 1A | 0 | 149 |
| Example 1A | 11.8 | 196 |
| Example 2A | 12.5 | 215 |
| Example 3A | 50.0 | 232 |
| Example 4A | 62.5 | 245 |
| Example 5A | 74.0 | 237 |
| Reference Example 2A | 88.2 | 0 |

Figure 5:
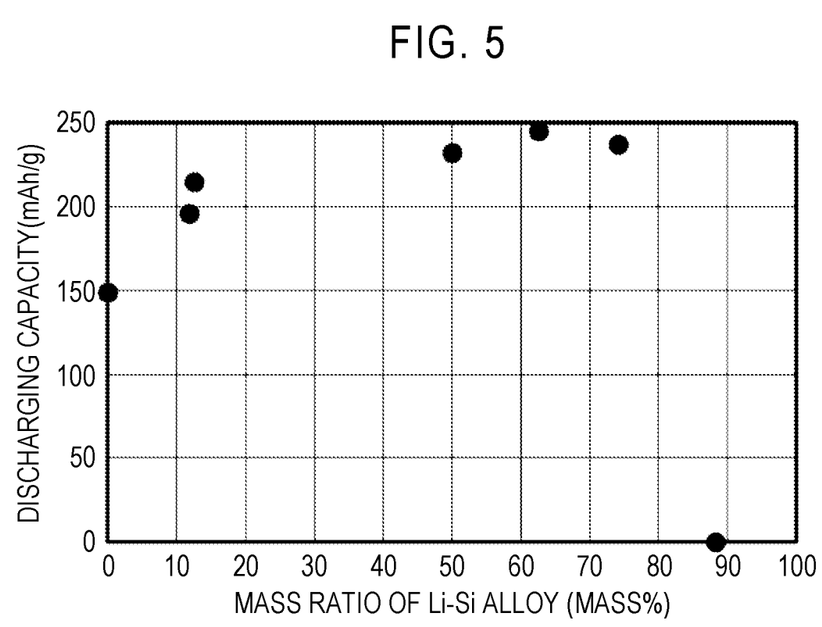
FIG. 5 shows the comparison results of discharging capacities.

The following can be understood from the results shown in Table 1 and FIG. 5.

As can be clearly understood from the results of Reference Example 1A, when the O2 type positive electrode active material was used in the positive electrode of the all-solid-state battery and only the elemental Si was used as the negative electrode active material in the negative electrode, the discharging capacity tended to decrease. It was thought that the amount of Li supplied from the negative electrode to the positive electrode was insufficient. In addition, as can be clearly understood from the results of Reference Example 2A, when the O2 type positive electrode active material was used in the positive electrode of the all-solid-state battery and an excessive amount of the Li—Si alloy was contained as the negative electrode active material in the negative electrode, the discharging capacity could not always be obtained. It was thought that Li was not occluded in the negative electrode during charging.

On the other hand, as can be clearly understood from the results of Examples 1A to 5A, when the O2 type positive electrode active material was used in the positive electrode of the all-solid-state battery and the elemental Si and the Li—Si alloy at a predetermined mass ratio were used as the negative electrode active material in the negative electrode, a significantly higher discharging capacity was obtained compared to Reference Examples 1A and 2A.

4. Supplement

Here, for improving the cycle characteristics of the all-solid-state battery using the O2 type positive electrode active material, the type of the negative electrode active material contained in the negative electrode is not particularly limited. In place of the above mixture of the elemental Si and the Li—Si alloy, various other negative electrode active materials can be used. As can be clearly understood from the results of Examples 1 to 3 and Comparative Example 1, it can be said that at least the following requirement (1) should be satisfied in order to improve the cycle characteristics of the all-solid-state battery using the O2 type positive electrode active material. In particular, if the following requirement (2) is satisfied, the cycle characteristics are likely to be further improved.

(1) The all-solid-state battery contains a positive electrode active material which has an O2 type structure and contains at least Li, Mn, Ni and O as constituent elements.

(2) The all-solid-state battery contains a positive electrode active material which has an O2 type structure and contains at least Li, Mn, Ni, Co and O as constituent elements.

What is claimed is:

1. An all-solid-state battery comprising:
a positive electrode;
a solid electrolyte layer; and
a negative electrode,
wherein the positive electrode contains a positive electrode active material,
the positive electrode active material has an O2-type crystal structure and has a chemical composition represented by $Li_xMn_aNi_bCo_cO_2$, where x satisfies $0<x<1$, a satisfies $0<a<1$, b satisfies $0<b<1$, c satisfies $0<c<1$, a+b+c is 0.8 or more and 1.2 or less, and O of the O2-type crystal structure means octahedral,
a surface of the positive electrode active material is composed of a protective layer containing a Li ion-conducting oxide, and
the negative electrode contains elemental Si as a negative electrode active material and a Li-Si alloy as a negative electrode active material, wherein a mass ratio of the Li-Si alloy with respect to a total amount of the elemental Si and the Li-Si alloy is 11.8 mass % or more and less than 88.2 mass %,
wherein a coverage area ratio of the protective layer is 70% or more of the surface of the positive electrode active material and a thickness of the protective layer is 0.1 nm or more and 100 nm or less.

2. The all-solid-state battery according to claim 1, wherein the solid electrolyte layer contains a sulfide solid electrolyte.

3. The all-solid-state battery according to claim 1, further comprising a restraining member.

4. The all-solid-state battery according to claim 1, wherein a surface of the positive electrode active material includes a protective layer containing a Li ion-conducting oxide.

5. The all-solid-state battery according to claim 1, wherein the O2-type crystal structure has two types of oxide layers in which Li occupies an octahedral site in an oxide or a double oxide and in which oxygen positions are different in a unit cell.

6. The all-solid-state battery according to claim 1, wherein the mass ratio of the Li-Si alloy with respect to a total amount of the elemental Si and the Li-Si alloy is 11.8 mass % or more and 74.0 mass % or less.

7. The all-solid-state battery according to claim 1, wherein the Li ion-conducting oxide in the protective layer of the positive electrode active material is selected from the group consisting of $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $LiNbO_3$, $Li_2MoO_4$, and $Li_2WO_4$.

8. The all-solid-state battery according to claim 1, wherein the coverage area ratio of the protective layer is 80% or more of the surface of the positive electrode active material.

9. The all-solid-state battery according to claim 1, wherein the coverage area ratio of the protective layer is 90% or more of the surface of the positive electrode active material.

10. The all-solid-state battery according to claim 1, wherein the thickness of the protective layer is 1 nm or more and 20 nm or less.

11. The all-solid-state battery according to claim 1, wherein the Li-Si alloy has a composition represented by $Li_\alpha Si_\beta$ where $0<\alpha/\beta \leq 4.4$.

12. The all-solid-state battery according to claim 1, wherein the Li-Si alloy is selected from the group consisting of $Li_{0.54}Si$, $Li_{0.87}Si$, $Li_{1.2}Si$, $Li_{2.2}Si$, $Li_{3.75}Si$, and $Li_{4.4}Si$.

* * * * *